(12) United States Patent  
Garcia et al.

(10) Patent No.: US 8,968,146 B2
(45) Date of Patent: Mar. 3, 2015

(54) MULTI-SPEED TRANSMISSION

(71) Applicant: GM Global Technology Operations LLC, Detroit, MI (US)

(72) Inventors: Pete R. Garcia, Troy, MI (US); Tejinder Singh, Commerce Township, MI (US); John A. Diemer, Farmington Hills, MI (US); Douglas John Dwenger, Plymouth, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 34 days.

(21) Appl. No.: 13/890,873

(22) Filed: May 9, 2013

(65) Prior Publication Data

US 2013/0324346 A1 Dec. 5, 2013

Related U.S. Application Data

(60) Provisional application No. 61/655,295, filed on Jun. 4, 2012.

(51) Int. Cl.
*F16H 3/44* (2006.01)
*F16H 3/62* (2006.01)
*F16H 3/66* (2006.01)

(52) U.S. Cl.
CPC .. *F16H 3/62* (2013.01); *F16H 3/66* (2013.01); *F16H 2200/0065* (2013.01); *F16H 2200/2012* (2013.01); *F16H 2200/2048* (2013.01); *F16H 2200/2082* (2013.01)
USPC .......................................... 475/284; 475/288

(58) Field of Classification Search
USPC .................................. 475/271, 280–291, 330
See application file for complete search history.

(56) References Cited

U.S. PATENT DOCUMENTS

| | | | | |
|---|---|---|---|---|
| 4,038,887 | A * | 8/1977 | Murakami et al. | 475/276 |
| 5,470,285 | A * | 11/1995 | Schneider et al. | 475/210 |
| 5,803,858 | A * | 9/1998 | Haka | 475/210 |
| 6,176,803 | B1 | 1/2001 | Meyer et al. | |
| 6,767,307 | B1 * | 7/2004 | Lee et al. | 475/276 |
| 6,984,187 | B2 | 1/2006 | Biermann | |
| 7,128,683 | B2 * | 10/2006 | Oguri et al. | 475/276 |
| 7,364,527 | B2 * | 4/2008 | Klemen | 475/290 |
| 7,497,802 | B2 * | 3/2009 | Kamm et al. | 475/282 |
| 7,824,297 | B2 * | 11/2010 | Carey et al. | 475/275 |

* cited by examiner

*Primary Examiner* — Michael Mansen
*Assistant Examiner* — Tinh Dang

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices include clutches and brakes actuatable in combinations of two to establish a plurality of forward gear ratios and one reverse gear ratio.

18 Claims, 4 Drawing Sheets

| GEAR STATE | GEAR RATIO | RATIO STEP | TORQUE TRANSMITTING DEVICES | | | | | | |
|---|---|---|---|---|---|---|---|---|---|
| | | | 34 | 30 | 36 | 32 | 26 | 24 | 28 |
| REV | -3.140 | | X | | | | | X | |
| N | | -0.73 | | | | | | | |
| 1ST | 4.302 | | X | | | | | | |
| 2ND | 2.964 | 1.45 | | | X | X | | | |
| 3RD | 2.656 | 1.12 | | X | X | | | | |
| 4TH | 2.132 | 1.25 | | | X | | | | X |
| 5TH | 1.743 | 1.22 | | | X | | | X | |
| 6TH | 1.357 | 1.28 | | | | | X | X | |
| 7TH | 1.000 | 1.36 | | X | | | X | X | |
| 8TH | 0.758 | 1.32 | | | | X | X | | |
| 9TH | 0.617 | 1.23 | | | | X | X | | |

X = ON - ENGAGED CARRYING TORQUE

FIG. 5

MULTI-SPEED TRANSMISSION

CROSS-REFERENCE TO RELATED APPLICATIONS

This application claims the benefit of U.S. Provisional Application No. 61/655,295 filed Jun. 4, 2012. The disclosure of the above application is incorporated herein by reference.

FIELD

The invention relates generally to a powertrain having a multiple speed transmission with a plurality of planetary gear sets and a plurality of torque transmitting devices and more particularly to a transmission arrangement having four planetary gear sets and seven torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A powertrain is provided having an input member, an output member, four planetary gear sets, a plurality of coupling members and a plurality of torque transmitting devices. Each of the planetary gear sets includes first, second and third members. The torque transmitting devices are for example clutches and brakes.

In one example the powertrain includes a housing having a first end wall, an input member, an output member, first, second, third and fourth planetary gear sets each having first, second and third members, a first interconnecting member continuously interconnecting the first member of the first planetary gear set with the second member of the second planetary gear set, a second interconnecting member continuously interconnecting the second member of the first planetary gear set with the third member of the third planetary gear set, a third interconnecting member continuously interconnecting the third member of the second planetary gear set with the second member of the third planetary gear set, a fourth interconnecting member continuously interconnecting the second member of the third planetary gear set with the second member of the fourth planetary gear set, and a fifth interconnecting member continuously interconnecting the third member of the third planetary gear set with the third member of the fourth planetary gear set. Seven torque transmitting devices are each selectively engageable to interconnect at least one of the first, second, and third members with at least one other of the first members, second members, third members and a stationary member. The fourth planetary gear set is disposed adjacent the first end wall of the housing, the third planetary gear set is adjacent the fourth planetary gear set, the second planetary gear set is adjacent the third planetary gear set, and the first planetary gear set is adjacent the second planetary gear set. The torque transmitting devices are selectively engageable in combinations of at least two to establish a plurality of forward speed ratios and at least one reverse speed ratio between the input member and the output member.

In another example of the powertrain, a starting device is interconnected to the input member, and the first planetary gear set is disposed adjacent the starting device.

In yet another example of the powertrain, the first member of the third planetary gear set is nested within the first member of the fourth planetary gear set.

In yet another example of the powertrain, a first of the seven torque transmitting devices is selectively engageable to interconnect the first member of the third planetary gear set with the input member.

In yet another example of the powertrain, a second of the seven torque transmitting devices is selectively engageable to interconnect the third member of the second planetary gear set, the third member of the fourth planetary gear set, and the second member of the third planetary gear set with the first member of the second planetary gear set and the input member.

In yet another example of the powertrain, a third of the seven torque transmitting devices is selectively engageable to interconnect the second member of the fourth planetary gear set, the second member of the third planetary gear set, and the third member of the second planetary gear set with the first member of the fourth planetary gear set.

In yet another example of the powertrain, a fourth of the seven torque transmitting devices is selectively engageable to interconnect the first member of the third planetary gear set with the stationary member.

In yet another example of the powertrain, a fifth of the seven torque transmitting devices is selectively engageable to interconnect the first member of the fourth planetary gear set with the stationary member.

In yet another example of the powertrain, a sixth of the seven torque transmitting devices is selectively engageable to interconnect the third member of the first planetary gear set with the stationary member.

In yet another example of the powertrain, a seventh of the seven torque transmitting devices is selectively engageable to interconnect the second member of the fourth planetary gear set, the second member of the third planetary gear set, and the third member of the second planetary gear set with the stationary member.

In yet another example of the powertrain, the seventh torque transmitting device is a selectable one-way clutch.

In yet another example of the powertrain, a clutch actuator is slidably disposed within the housing and the clutch actuator selectively engages the third clutch through a bearing connected to the third clutch.

In yet another example of the powertrain, the first and second clutches are disposed axially adjacent to and in approximate radial alignment with the fourth planetary gear set, the fourth and fifth clutches are disposed axially adjacent to and radially outward from the fourth planetary gear set, the third clutch is disposed in radial alignment outwardly of the fourth planetary gear set, the seventh clutch is disposed radially outwardly of the third planetary gear set, and the sixth clutch is disposed axially forward of and radially outward of the first planetary gear set.

In yet another example of the powertrain, the third member of the first planetary gear set, the first member of the second planetary gear set, the first member of the third planetary gear set and the first member of the fourth planetary gear set are sun gears, the second member of the first planetary gear set, the second member of the second planetary gear set, the second member of the third planetary gear set and the second member of the fourth planetary gear set are carrier members, and the first member of the first planetary gear set, the third member of the second planetary gear set, the third member of the third planetary gear set and the third member of the fourth planetary gear set are ring gears.

In yet another example of the powertrain, the output member is continuously interconnected with the second member of the first planetary gear set, the third member of the third planetary gear set and the third member of the fourth planetary gear set.

In yet another example of the powertrain, the input member is continuously interconnected with the first member of the second planetary gear set.

In yet another example of the powertrain a transfer gear train is included having a first transfer gear intermeshed with a second transfer gear, wherein the first transfer gear is rotatably fixed to the output member and the second transfer gear is rotatably fixed to an intermediate shaft, a differential gear set for driving a pair of road wheels, a pinion gear rotatably fixed to the intermediate shaft, and an input differential gear in mesh with the pinion gear and configured to rotatably drive the differential gear set.

In yet another example of the powertrain, a power transfer assembly is provided having a first transfer gear and a second transfer gear, wherein the first transfer gear is rotatably fixed to the output member and the second transfer gear is rotatably fixed to a drive shaft, a power transfer member rotatably coupling the first and second transfer gears for transferring rotational energy from the first transfer gear to the second transfer gear, a final drive planetary gear set coupled to the drive shaft for receiving a driving torque from the second transfer gear, and a differential gear set coupled to the final drive planetary gear set and to a pair of road wheels for receiving a final drive rotational torque and transferring the final drive torque to the pair of road wheels.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 5 is a truth table presenting the state of engagement of the various torque transmitting elements in each of the available forward and reverse speeds or gear ratios of the transmissions illustrated in FIGS. 1 and 2.

DETAILED DESCRIPTION

The following description is merely exemplary in nature and is not intended to limit the present disclosure, application, or uses.

At the outset, it should be appreciated that the embodiments of the multi-speed automatic transmissions of the present invention have an arrangement of permanent mechanical connections between the elements of the four planetary gear sets. For example, a first component or element of a first planetary gear set is permanently coupled to a second component or element of the second planetary gear set. A second component or element of the first planetary gear set is permanently coupled a third component or element of the third planetary gear set and to a third component or element of the fourth planetary gear set. A third component or element of the second planetary gear set is permanently coupled to a second component or element of the third planetary gear set and a second component or element of the fourth planetary gear set. A second component or element of the third planetary gear set is permanently coupled a second component or element of the fourth planetary gear set. A third component or element of the third planetary gear set is permanently coupled a third component or element of the fourth planetary gear set.

Figure 1:
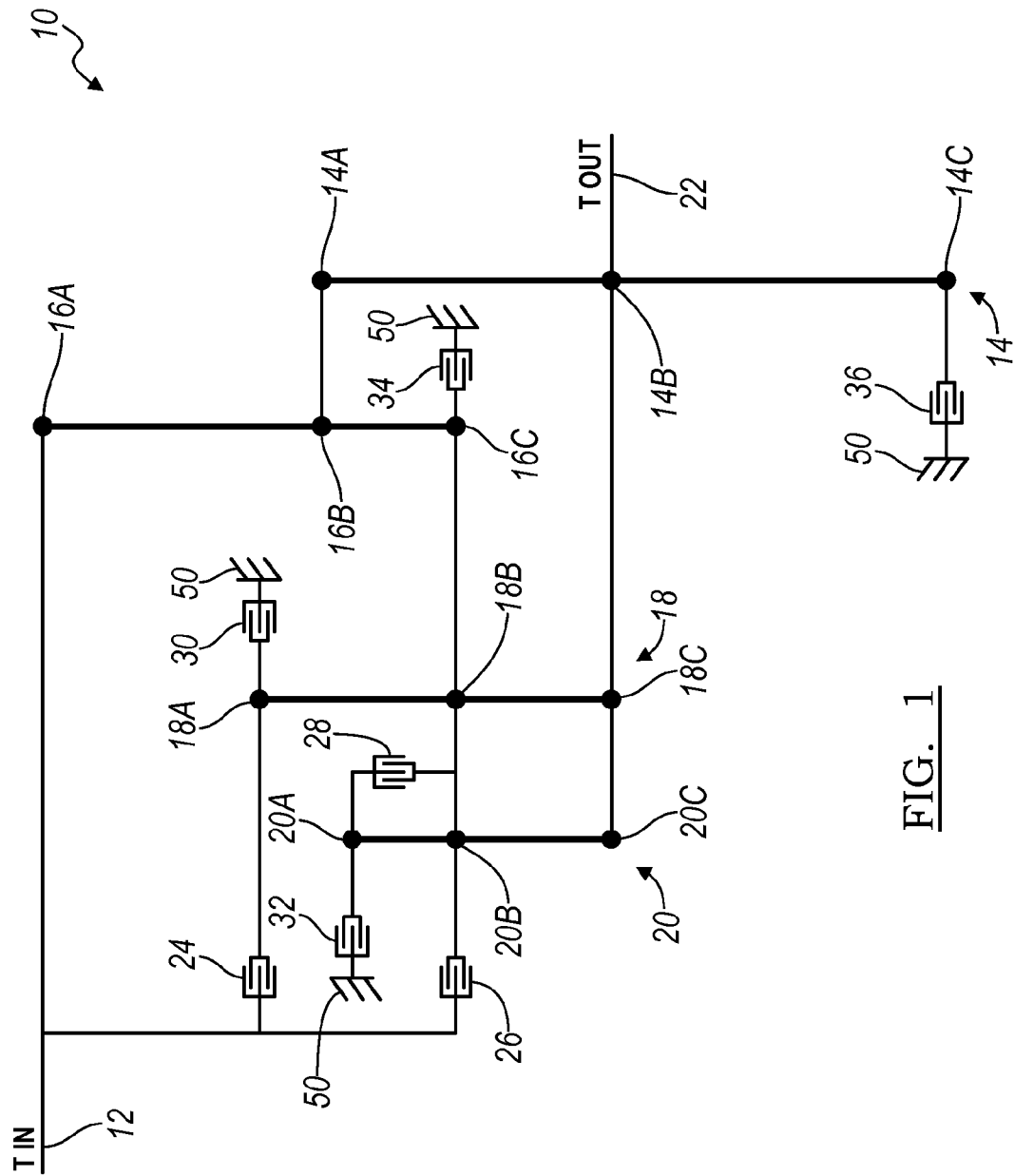
FIG. 1 is a lever diagram of an embodiment of a nine speed transmission according to the present invention.

Referring now to FIG. 1, an embodiment of a nine speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. The first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B, and a third node 18C. The fourth planetary gear set 20 has three nodes: a first node 20A, a second node 20B, and a third node 20C.

The input member 12 is continuously coupled to the first node 16A of the second planetary gear set 16. The output member 22 is coupled to the second node 14B of the first planetary gear set 14 and the third node 18C of the third planetary gear set 18 and the third node 20C of the fourth planetary gear set 20. The first node 14A of the first planetary gear set 14 is coupled to the second node 16B of the second planetary gear set 16. The third node 16C of the second planetary gear set 16 is coupled to the second node 18B of the third planetary gear set 18 and the second node 20B of the fourth planetary gear set 20.

A first clutch 24 selectively connects the first node 16A of the second planetary gear set 16 and the input member or shaft 12 with the first node 18A of the third planetary gear set 18. A second clutch 26 selectively connects the first node 16A of the second planetary gear set 16 and the input member or shaft 12 with the second nodes 18B and 20B of the of the third and fourth planetary gear sets 18, 20 and the third node 16C of the second planetary gear set 16. A third clutch 28 selectively connects the second nodes 18B and 20B of the third and fourth planetary gear sets 18, 20 with the first node 20A of the fourth planetary gear set 20. A first brake 30 selectively connects the first node 18A of the third and fourth planetary gear set 18 with a stationary member or transmission housing 50. A second brake 32 selectively connects the first node 20A of the fourth planetary gear set 20 with a stationary member or transmission housing 50. A third brake 34 selectively connects the second nodes 18B,20B of the third and fourth planetary gear sets 18, 20 and the third node 16C of the second planetary gear set 16 with the stationary member or transmission housing 50. A fourth brake 36 selectively connects the third node 14C of the first planetary gear set 14 with the stationary member or transmission housing 50.

Figure 2:
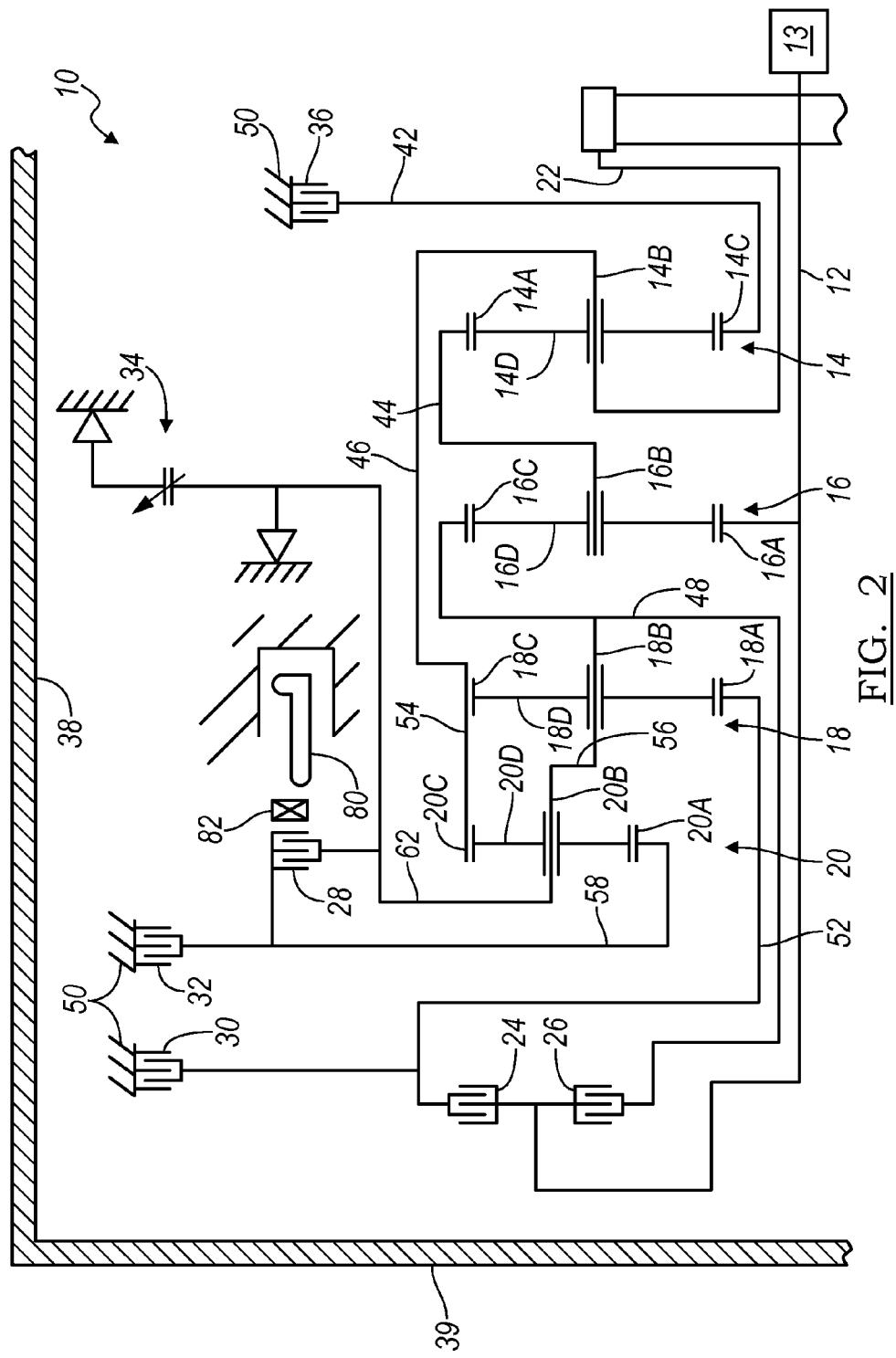
FIG. 2 is a diagrammatic illustration of an embodiment of a nine speed transmission according to the present invention.

Referring now to FIG. 2, a stick diagram presents a schematic layout of an embodiment of the nine speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers. In an embodiment of the present invention, the four planetary gear sets 14, 16, 18 and 20 are simple planetary gear sets, as described below. However, the present invention contemplates other embodiments that replace the simple planetary gear sets with all or a combination of compound planetary gear sets having two or more sets of planet pinions supported by a single carrier member.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or interconnecting member 42. The ring gear member 14A is connected for common rotation with a second shaft or interconnecting member 44. The planet carrier member 14B is connected for common rotation with a third shaft or interconnecting member 46 and the output shaft or member 22. The planet gears 14D are each configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the input shaft or member 12. The ring gear member 16C is connected for common rotation with a fourth shaft or interconnecting member 48. The planet carrier member 16B is connected for common rotation with the second shaft or interconnecting member 44. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with a fifth shaft or interconnecting member 52. The ring gear member 18C is connected for common rotation with the third shaft or interconnecting member 46 and with a sixth shaft or interconnecting member 54. The planet carrier member 18B is connected for common rotation with the fourth shaft or interconnecting member 48 and with a seventh shaft or interconnecting member 56. The planet gears 18D are each configured to intermesh with both the sun gear member 18A and the ring gear member 18C.

The planetary gear set 20 includes a sun gear member 20A, a ring gear member 20C and a planet gear carrier member 20B that rotatably supports a set of planet gears 20D (only one of which is shown). The sun gear member 20A is connected for common rotation with an eighth shaft or interconnecting member 58. The ring gear member 20C is connected for common rotation with the sixth shaft or interconnecting member 54. The planet carrier member 20B is connected for common rotation with the seventh shaft or interconnecting member 56 and with a tenth shaft or interconnecting member 62. The planet gears 20D are each configured to intermesh with both the sun gear member 20A and the ring gear member 20C.

The input shaft or member 12 is continuously connected to an engine (not shown) through a turbine of a torque converter, fluid coupling, friction launch clutch or other starting device 13. The output shaft or member 22 is continuously connected with the final drive unit or transfer case (not shown).

The torque-transmitting mechanisms or clutches 24, 26, 28 and brakes 30, 32, 34, 36 allow for selective interconnection of the shafts or interconnecting members, members of the planetary gear sets and the housing. The clutches 24, 26, 28 and brakes 30, 32, 34, 36 are friction, dog or synchronizer type mechanisms or the like. For example, the first clutch 24 is selectively engageable to connect the input shaft or member 12 with the fifth shaft or interconnecting member 52. The second clutch 26 is selectively engageable to connect the input shaft or member 12 with the fourth shaft or interconnecting member 48. The third clutch 28 is selectively engageable to connect the eighth shaft or interconnecting member 58 with the tenth shaft or interconnecting member 62. In one embodiment, the third clutch 28 is applied by a clutch actuator 80 slidably disposed in the housing 50. The clutch actuator 80 applies the third clutch 28 through a bearing 82 connected to the third clutch 28. It should be appreciated that the clutch 28 can be arranged in a variety of different ways so long as the clutch 28 connects any two nodes of either the planetary gear set 18 or the planetary gear set 20.

Alternatively, the third clutch 28 may be omitted from the transmission 10 rendering the transmission 10 a fully operational 8-speed transmission. The first brake 30 is selectively engageable to connect the fifth shaft or interconnecting member 52 with the stationary element or the transmission housing 50 in order to restrict the member 52 from rotating relative to the transmission housing 50. The second brake 32 is selectively engageable to connect the eighth shaft or interconnecting member 58 with the stationary element or the transmission housing 50 in order to restrict the member 58 from rotating relative to the transmission housing 50. The third brake 34 is selectively engageable to connect the tenth shaft or interconnecting member 62 with the stationary element or the transmission housing 50 in order to restrict the member 62 from rotating relative to the transmission housing 50. In an alternate embodiment, the third brake 34 is a selectable one-way clutch. The fourth brake 36 is selectively engageable to connect the first shaft or interconnecting member 42 with the stationary element or the transmission housing 50 in order to restrict the member 42 from rotating relative to the transmission housing 50.

The planetary gear sets and clutches/brakes of the transmission 10 are arranged to provide efficient axial and radial packaging. The transmission includes a transmission housing 38 having a first end wall 39. The first end wall 39 is disposed at an end of the transmission opposite the starting device 13. The first planetary gear set 14 is disposed axially adjacent a front or proximate end of the transmission 10 (i.e. an end of the transmission 10 proximate the starting device 13). The second planetary gear set 16 is disposed adjacent the first planetary gear set 14. The third planetary gear set 18 is disposed adjacent the second planetary gear set 16. Finally, the fourth planetary gear set 20 is disposed adjacent the third planetary gear set 18 and is located at a distal end of the transmission 10 (i.e. farthest axially from the starting device 13) proximate the first end wall. In a preferred embodiment, the third and fourth planetary gear sets 18 and 20 share common ring gear members and carrier members with radially offset, partially nested, sun gears in order to provide additional axial space savings. The clutches 24 and 26 are disposed axially adjacent to and in approximate radial alignment with the fourth planetary gear set 20. The brakes 30 and 32 are disposed axially adjacent to but radially outward from the fourth planetary gear set 20. The clutch 28 is disposed in radial alignment outwardly of the fourth planetary gear set 20. The brake 34 is disposed radially outwardly of the third planetary gear set 18. The brake 36 is disposed axially forward of and radially outward of the first planetary gear set 14.

Figure 3:
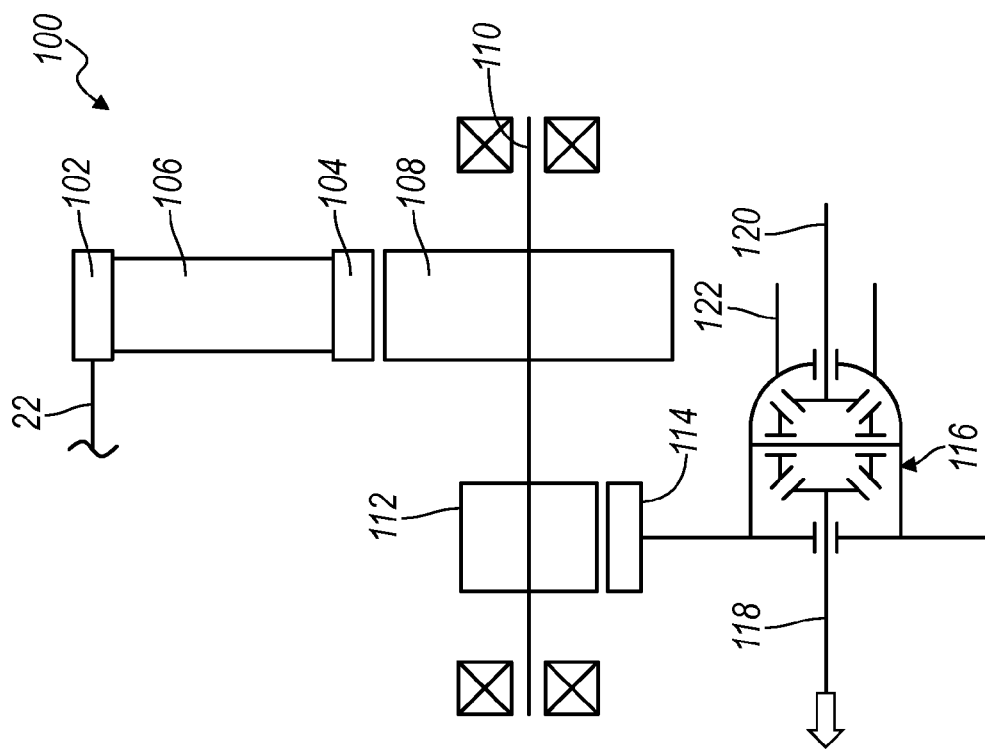
FIG. 3 is a schematic diagram of a 3-axis gear transfer arrangement incorporating the transmission of FIGS. 1-2 according to the principles of the present invention.

Turning to FIG. 3, the output 22 of the transmission 10 may be connected to a transfer gear train 100. The transfer gear train 100 includes a first transfer gear 102 connected to a second transfer gear 104 via a drive chain 106. The first transfer gear is connected to the transmission output shaft 22. The second transfer gear 104 is meshed with a driven gear 108 rotatably fixed to an interconnecting shaft or rotatable member 110. Further, a pinion 112 is mounted to the shaft 110 and intermeshes with an input differential gear 114. Input differential gear 114 transfers driving torque to a differential 116. Differential 116, as conventionally known, transfers driving torque to two drive axles 118 and 120 as well as a differential housing 122. Drive axles 118 and 120 are independently driven by differential 116 to supply the driving torque to the vehicle road wheels (not shown).

Figure 4:
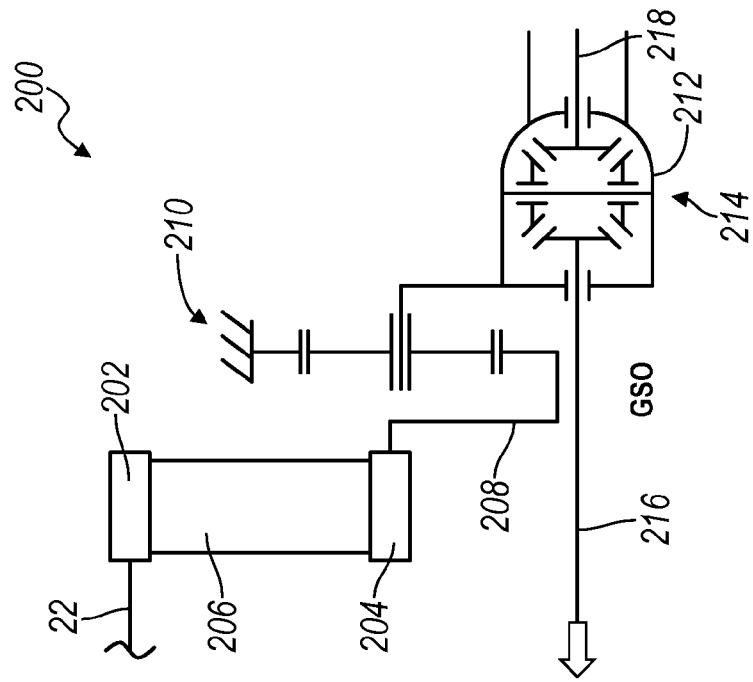
FIG. 4 is a schematic diagram of a 2-axis chain transfer arrangement incorporating the transmission of FIGS. 1-2 according to the principles of the present invention.

Referring now to FIG. 4, another embodiment of a transfer gear train is generally indicated by reference number 200. The transfer gear train 200 includes a first transfer gear 202 connected to a second transfer gear 204 via a drive chain 206. The first transfer gear is connected to the transmission output shaft 22. The second transfer gear 204 is rotatably fixed to a drive shaft or rotatable member 208. Further, drive shaft 208 is coupled to a sun gear of a final drive planetary gear set 210 to achieve the desired gear ratio. The final drive planetary gear set 210 transfers driving torque through the carrier member of the final drive planetary gear set 210 to a housing 212 of a differential 214. Differential 214, as conventionally known, transfers the driving torque to two drive axles 216 and 218 through bevel gears of differential 214. Drive axles 216 and 218 are independently driven by differential 214 to supply the driving torque to the vehicle road wheels (not shown).

Referring now to FIG. 2 and FIG. 5, the operation of the nine speed transmission 10 will be described. It will be appreciated that transmission 10 is capable of transmitting torque from the input shaft or member 12 to the output shaft or member 22 in at least nine forward speed or torque ratios and at least one reverse speed or torque ratio. Each forward and reverse speed or torque ratio is attained by engagement of two or more of the torque-transmitting mechanisms (i.e. first clutch 24, second clutch 26, third clutch 28, first brake 30, second brake 32, third brake 34 and fourth brake 36), as will be explained below. FIG. 5 is a truth table that present the various combinations of torque-transmitting mechanisms that are activated or engaged to achieve the various gear states. An "X" in the box means that the particular referenced clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example, a reverse gear is established through the engagement or activation of the first clutch 24 and third brake 34. The first clutch 24 connects the input shaft or member 12 with the fifth shaft or interconnecting member 52. The third brake 34 connects the tenth shaft or interconnecting member 62 with the stationary element or the transmission housing 50 in order to restrict the member 62 from rotating relative to the transmission housing 50. Likewise, the nine forward ratios are achieved through different combinations of clutch and brake engagement, as shown in FIG. 5.

It will be appreciated that the foregoing explanation of operation and gear states of the nine speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated. The above described transmission is an architecturally efficient and novel layout having a clutch and gear arrangement that improves transmission packaging for improved mass and cost.

The description of the invention is merely exemplary in nature and variations that do not depart from the gist of the invention are intended to be within the scope of the invention. Such variations are not to be regarded as a departure from the spirit and scope of the invention.

The following is claimed:
1. A powertrain comprising:
a housing having a first end wall;
an input member;
an output member;
first, second, third and fourth planetary gear sets each having first, second and third members, wherein the input member is continuously interconnected with the first member of the second planetary gear set;
a first interconnecting member continuously interconnecting the first member of the first planetary gear set with the second member of the second planetary gear set;
a second interconnecting member continuously interconnecting the second member of the first planetary gear set with the third member of the third planetary gear set;

a third interconnecting member continuously interconnecting the third member of the second planetary gear set with the second member of the third planetary gear set;

a fourth interconnecting member continuously interconnecting the second member of the third planetary gear set with the second member of the fourth planetary gear set;

a fifth interconnecting member continuously interconnecting the third member of the third planetary gear set with the third member of the fourth planetary gear set; and seven torque transmitting devices each selectively engageable to interconnect at least one of the first, second, and third members with at least one other of the first members, second members, third members and a stationary member, wherein the fourth planetary gear set is disposed adjacent the first end wall of the housing, the third planetary gear set is adjacent the fourth planetary gear set, the second planetary gear set is adjacent the third planetary gear set, and the first planetary gear set is adjacent the second planetary gear set, and wherein the torque transmitting devices are selectively engageable in combinations of at least two to establish a plurality of forward speed ratios and at least one reverse speed ratio between the input member and the output member.

2. The powertrain of claim 1 further comprising a starting device interconnected to the input member, and wherein the first planetary gear set is disposed adjacent the starting device.

3. The powertrain of claim 1 wherein the first member of the third planetary gear set is nested within the first member of the fourth planetary gear set.

4. The powertrain of claim 1 wherein a first of the seven torque transmitting devices is selectively engageable to interconnect the first member of the third planetary gear set with the input member.

5. The powertrain of claim 4 wherein a second of the seven torque transmitting devices is selectively engageable to interconnect the third member of the second planetary gear set, the second member of the fourth planetary gear set, and the second member of the third planetary gear set with the first member of the second planetary gear set and the input member.

6. The powertrain of claim 5 wherein a third of the seven torque transmitting devices is selectively engageable to interconnect the second member of the fourth planetary gear set, the second member of the third planetary gear set, and the third member of the second planetary gear set with the first member of the fourth planetary gear set.

7. The powertrain of claim 6 wherein a fourth of the seven torque transmitting devices is selectively engageable to interconnect the first member of the third planetary gear set with the stationary member.

8. The powertrain of claim 7 wherein a fifth of the seven torque transmitting devices is selectively engageable to interconnect the first member of the fourth planetary gear set with the stationary member.

9. The powertrain of claim 8 wherein a sixth of the seven torque transmitting devices is selectively engageable to interconnect the third member of the first planetary gear set with the stationary member.

10. The powertrain of claim 9 wherein a seventh of the seven torque transmitting devices is selectively engageable to interconnect the second member of the fourth planetary gear set, the second member of the third planetary gear set, and the third member of the second planetary gear set with the stationary member.

11. The powertrain of claim 10 wherein the seventh torque transmitting device is a selectable one-way clutch.

12. The powertrain of claim 10 wherein the first and second torque transmitting devices are disposed axially adjacent to and in approximate radial alignment with the fourth planetary gear set, the fourth and fifth torque transmitting devices are disposed axially adjacent to and radially outward from the fourth planetary gear set, the third torque transmitting device is disposed in radial alignment outwardly of the fourth planetary gear set, the seventh torque transmitting device is disposed radially outwardly of the third planetary gear set, and the sixth torque transmitting device is disposed axially forward of and radially outward of the first planetary gear set.

13. The powertrain of claim 1 wherein the third member of the first planetary gear set, the first member of the second planetary gear set, the first member of the third planetary gear set and the first member of the fourth planetary gear set are sun gears, the second member of the first planetary gear set, the second member of the second planetary gear set, the second member of the third planetary gear set and the second member of the fourth planetary gear set are carrier members, and the first member of the first planetary gear set, the third member of the second planetary gear set, the third member of the third planetary gear set and the third member of the fourth planetary gear set are ring gears.

14. The powertrain of claim 1 wherein the output member is continuously interconnected with the second member of the first planetary gear set, the third member of the third planetary gear set and the third member of the fourth planetary gear set.

15. The powertrain of claim 1 further comprising:
a transfer gear train having a first transfer gear intermeshed with a second transfer gear, wherein the first transfer gear is rotatably fixed to the output member and the second transfer gear is rotatably fixed to an intermediate shaft;
a differential gear set for driving a pair of road wheels;
a pinion gear rotatably fixed to the intermediate shaft; and
an input differential gear in mesh with the pinion gear and configured to rotatably drive the differential gear set.

16. The powertrain of claim 1 further comprising:
a power transfer assembly having a first transfer gear and a second transfer gear, wherein the first transfer gear is rotatably fixed to the output member and the second transfer gear is rotatably fixed to a drive shaft;
a power transfer member rotatably coupling the first and second transfer gears for transferring rotational energy from the first transfer gear to the second transfer gear;
a final drive planetary gear set coupled to the drive shaft for receiving a driving torque from the second transfer gear; and
a differential gear set coupled to the final drive planetary gear set and to a pair of road wheels for receiving a final drive rotational torque and transferring the final drive torque to the pair of road wheels.

17. A powertrain comprising:
a housing having a first end wall;
an input member;
an output member;
first, second, third and fourth planetary gear sets each having first, second and third members;
a first interconnecting member continuously interconnecting the first member of the first planetary gear set with the second member of the second planetary gear set;

a second interconnecting member continuously interconnecting the second member of the first planetary gear set with the third member of the third planetary gear set;

a third interconnecting member continuously interconnecting the third member of the second planetary gear set with the second member of the third planetary gear set;

a fourth interconnecting member continuously interconnecting the second member of the third planetary gear set with the second member of the fourth planetary gear set;

a fifth interconnecting member continuously interconnecting the third member of the third planetary gear set with the third member of the fourth planetary gear set;

a first torque transmitting device selectively engageable to interconnect the first member of the third planetary gear set with the input member;

a second torque transmitting device selectively engageable to interconnect the third member of the second planetary gear set, the second member of the fourth planetary gear set, and the second member of the third planetary gear set with the first member of the second planetary gear set and the input member;

a third torque transmitting device selectively engageable to interconnect the second member of the fourth planetary gear set, the second member of the third planetary gear set, and the third member of the second planetary gear set with the first member of the fourth planetary gear set;

a fourth torque transmitting device selectively engageable to interconnect the first member of the third planetary gear set with the stationary member;

a fifth torque transmitting device selectively engageable to interconnect the first member of the fourth planetary gear set with the stationary member;

a sixth torque transmitting device selectively engageable to interconnect the third member of the first planetary gear set with the stationary member;

a seventh torque transmitting device selectively engageable to interconnect the second member of the fourth planetary gear set, the second member of the third planetary gear set, and the third member of the second planetary gear set with the stationary member, wherein the fourth planetary gear set is disposed adjacent the first end wall of the housing, the third planetary gear set is adjacent the fourth planetary gear set, the second planetary gear set is adjacent the third planetary gear set, and the first planetary gear set is adjacent the second planetary gear set, and the first, second, fourth, and fifth clutches are disposed between the fourth planetary gear set and the first end wall, and wherein the torque transmitting devices are selectively engageable in combinations of at least two to establish a plurality of forward speed ratios and at least one reverse speed ratio between the input member and the output member.

18. The powertrain of claim 17 wherein the seventh torque transmitting device is a selectable one-way clutch.

* * * * *